(12) United States Patent
Haschick et al.

(10) Patent No.: US 9,765,167 B2
(45) Date of Patent: Sep. 19, 2017

(54) REVERSE-PHASE POLYMERISATION PROCESS

(71) Applicant: BASF SE, Ludwigshafen (DE)

(72) Inventors: Robert Haschick, Mannheim (DE); Aleksandra Jelicic, Mannheim (DE); John Scott Barratt, Mirfield (GB); Pascal Hesse, Mannheim (DE); Oliver Soetje, Mannheim (DE); Gabriela Eugenia Fonseca Zepeda, Mannheim (DE); Shankara Narayanan Keelapandal Ramamoorthy, Limburgerhof (DE); Bjoern Langlotz, Trostberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/908,925

(22) PCT Filed: Jul. 29, 2014

(86) PCT No.: PCT/EP2014/066255
§ 371 (c)(1),
(2) Date: Jan. 29, 2016

(87) PCT Pub. No.: WO2015/014826
PCT Pub. Date: Feb. 5, 2015

(65) Prior Publication Data
US 2016/0159955 A1 Jun. 9, 2016

(30) Foreign Application Priority Data

Jul. 31, 2013 (EP) .................................... 13178685

(51) Int. Cl.
| | | |
|---|---|---|
| C08F 2/46 | (2006.01) | |
| C08F 2/50 | (2006.01) | |
| C08G 61/04 | (2006.01) | |
| C08F 220/56 | (2006.01) | |
| C08F 2/32 | (2006.01) | |
| B01J 19/12 | (2006.01) | |
| B01J 19/24 | (2006.01) | |
| C08F 220/06 | (2006.01) | |
| C08F 220/20 | (2006.01) | |

(Continued)

(52) U.S. Cl.
CPC ........... *C08F 220/56* (2013.01); *B01J 19/123* (2013.01); *B01J 19/24* (2013.01); *C08F 2/32* (2013.01); *B01J 2219/0869* (2013.01); *B01J 2219/1203* (2013.01); *B01J 2219/24* (2013.01); *C08F 220/06* (2013.01); *C08F 220/20* (2013.01); *C08F 226/10* (2013.01); *C08F 2220/382* (2013.01); *C08F 2220/385* (2013.01)

(58) Field of Classification Search
CPC ........ C08F 220/56; C08F 2/32; C08F 220/06; C08F 2220/385; C08F 220/20; C08F 2220/382; C08F 220/34; B01J 19/23; B01J 2219/0869; B01J 2219/24; B01J 19/24; B01J 2219/1203
USPC ........... 522/62, 6, 63, 71, 189, 184, 1; 520/1
See application file for complete search history.

(56) References Cited

U.S. PATENT DOCUMENTS

| | | |
|---|---|---|
| 3,922,255 A | 11/1975 | Koestler et al. |
| 4,444,961 A | 4/1984 | Timm et al. |

(Continued)

FOREIGN PATENT DOCUMENTS

| | | |
|---|---|---|
| CA | 1037899 | 9/1978 |
| CN | 1191496 A | 8/1998 |

(Continued)

OTHER PUBLICATIONS

Eli Ruckenstein et al. "Sedimentation Polymerization", Polymer, vol. 36, No. 14, 1995, pp. 2857-1860.

(Continued)

*Primary Examiner* — Jessica E Whiteley
(74) *Attorney, Agent, or Firm* — Oblon, McClelland, Maier & Neustadt, L.L.P.

(57) ABSTRACT

A reverse-phase suspension polymerization process for the manufacture of polymer beads comprising forming aqueous monomer beads comprising an aqueous solution of water-soluble ethylenically unsaturated monomer or monomer blend and polymerizing the monomer or monomer blend to form polymer beads while suspended in a non-aqueous liquid, and recovering polymer beads, in which the process comprises, providing in a vessel (1) a volume (2) of non-aqueous liquid wherein the volume of non-aqueous liquid extends between at least one polymer bead discharge point (3) and at least one monomer feed point (4), feeding the aqueous monomer or monomer blend through orifices (5) into, or onto, the non-aqueous liquid to form aqueous monomer beads, allowing the aqueous monomer beads to flow towards the polymer bead discharge point subjecting the aqueous monomer beads to polymerization conditions to initiate polymerization to form polymerizing beads, wherein the polymerizing beads have formed polymer beads when they reach the polymer bead discharge point, removing a suspension of the polymer beads in non-aqueous liquid from the vessel at the polymer bead discharge point and recovering water soluble or water swellable polymer beads from the suspension. The invention also relates to the apparatus suitable for carrying out a reverse-phase suspension polymerization and polymer beads obtainable by the process or employing the apparatus.

23 Claims, 1 Drawing Sheet

(51) Int. Cl.
*C08F 226/10* (2006.01)
*C08F 220/38* (2006.01)

(56) References Cited

U.S. PATENT DOCUMENTS

| | | | |
|---|---|---|---|
| 4,579,718 A | 4/1986 | Vairetti et al. | |
| 4,879,361 A | 11/1989 | Rehmer et al. | |
| 5,548,047 A | 8/1996 | Ito et al. | |
| 6,277,932 B1 | 8/2001 | Whitley et al. | |
| 2004/0048945 A1* | 3/2004 | Ueshima | C08F 8/22 522/114 |
| 2004/0048988 A1* | 3/2004 | Gillett | B01J 19/123 526/65 |
| 2004/0077744 A1 | 4/2004 | Naylor et al. | |
| 2011/0294968 A1 | 12/2011 | Abboud et al. | |

FOREIGN PATENT DOCUMENTS

| | | |
|---|---|---|
| DE | 37 09 921 A1 | 10/1988 |
| EP | 0 051 210 A2 | 5/1982 |
| EP | 0 067 415 A1 | 12/1982 |
| EP | 0 271 922 A2 | 6/1988 |
| EP | 0 952 989 | 3/1999 |
| EP | 2 377 609 A1 | 10/2011 |
| GB | 98/30598 * | 7/1998 |
| JP | 50-74689 A | 6/1975 |
| JP | 51-150592 | 12/1976 |
| JP | 51-150592 A2 | 12/1976 |
| JP | 5-17509 A | 1/1993 |
| JP | 2001-508099 A | 6/2001 |
| KR | 10-0766737 B1 | 10/2007 |
| SU | 1781234 A1 | 7/1990 |
| WO | WO 96/40427 A1 | 12/1996 |
| WO | 98/30598 * | 7/1998 |
| WO | 98/30598 A1 | 7/1998 |
| WO | WO 01/55228 A1 | 8/2001 |
| WO | 03/066190 A1 | 8/2003 |

OTHER PUBLICATIONS

Pablo A. Hoijemberg et al. "Radical Photopolymerization in Miniemulsions. Fundamental Investigations and Technical Development", Macromolecules, vol. 44, 2011, pp. 8727-8738.
Third Party Observation issued Dec. 2, 2015 in PCT/EP2014/066255.
International Search Report Issued Oct. 9, 2014 in PCT/EP14/066255 Filed Jul. 29, 2014.
Combined Chinese Office Action and Search Report issued Oct. 8, 2016 in patent application No. 201480054364.6 with partial English translation and English translation of categories of cited documents.
Korean Office Action issued Dec. 29, 2016 in patent application No. 10-2016-7004779 with English translation.
Office Action issued Dec. 20, 2016 in Japanese Patent Application No. 2016-530489 (submitting English language translation only).
Office Action issued Mar. 7, 2017 in Russian Patent Application No. 2016106939 (with English translation).
U.S. Appl. No. 14/908,872, filed Jan. 29, 2016, Pascal Hesse et al.
U.S. Appl. No. 14/908,823, filed Jan. 29, 2016, John S. Barratt et al.

* cited by examiner

REVERSE-PHASE POLYMERISATION PROCESS

The present invention relates to a process for the preparation of polymers by reverse-phase polymerisation. In particular the process involves the polymerisation of water-soluble ethylenically unsaturated monomers by a reverse-phase suspension polymerisation process to form polymeric beads.

It is known to manufacture water-soluble or water swellable polymer beads by reverse-phase polymerisation. Reverse-phase polymerisation processes comprise forming droplets of an aqueous solution of water-soluble ethylenically unsaturated monomer or monomer blend and polymerising the monomer or monomer blend, while the droplets are suspended in a non-aqueous liquid, to form aqueous polymer droplets. Where the monomer or monomer blend is formed into an emulsion or microemulsion in the continuous phase of non-aqueous liquid the resulting products would be reverse-phase emulsions or microemulsions of the polymer. In the case where the droplets of monomer or monomer blend are not emulsified into the non-aqueous liquid resulting polymer would be in the form of beads. Generally the droplet size of such beads would be larger than for emulsions or microemulsions. Typically such reverse-phase processes for making polymer beads are referred to as reverse-phase suspension polymerisation processes. If the droplets are beads, the polymerisation process is generally completed by drying the resultant polymer beads and separating the polymer beads from the non-aqueous liquid.

A variety of initiation systems have been employed in the manufacture of polymers. Frequently, the polymerisation of water-soluble monomer or monomer blends involves redox initiator systems or thermal initiator systems or combination of both. Redox initiator systems usually employ a redox couple which involves a chemical reducing agent and a chemical oxidising agent. Used in combination radicals are formed which would combine with monomer molecules to initiate the polymerisation. Thermal initiators are compounds which start decaying at certain temperatures to generate radicals which in combination with monomer molecules will initiate the polymerisation.

It is also known to use photochemical means to initiate polymerisation. Such systems generally involve the use of a chemical photoinitiator which remains stable until it is subjected to radiation, for instance ultraviolet light, visible light, infrared light, at which time the compound breaks down to generate radicals which in the presence of monomer would initiate the polymerisation. Often, photochemical means of polymerisation such as ultraviolet light initiated polymerisation processes are used to polymerise a thin layer of monomer to form a thin film of polymer rather than polymerisation of monomer in bulk systems. Generally, this is because the radiation such as ultraviolet light has a limited ability to penetrate.

Ultraviolet polymerisation of emulsion or suspension polymerisation processes is further complicated due to the heterogeneity of the two phase system.

Pablo A Hoijemberg et al, Macromolecules 2011, 44, 8727-8738 describes radical photo polymerisation in mini emulsions of water insoluble acrylate monomer in an aqueous liquid within a tubular reactor.

It is known to use photochemical reactions in a variety of situations. For instance, EP 2377609 relates to a photochemical reactor involving a central axial irradiation unit that includes at least one radiation source. This unit is surrounded by a reactor wall and employs an annular gap coaxially and between the reactor wall and the irradiation unit. A variety of radiation sources is described for use as the radiation source including an LED array. However, this document does not describe polymerisation processes.

The usual way of performing a reverse-phase suspension polymerisation process comprises charging a reaction vessel with non-aqueous liquid and dispersing the aqueous monomer or monomer blend in bulk into the non-aqueous liquid with sufficient agitation to form the aqueous monomer beads suspended in the non-aqueous liquid typically containing suitable stabilisers or protective colloids for the aqueous droplets. The resultant particle size distribution tends to be much narrower, and the amount of fines tends to be much less than when the polymer is made by the widely used gel polymerisation and comminution process and this is advantageous. However, the reverse-phase bead polymerisation process does have a tendency to produce beads having a wider net size distribution than would be desired including fines and some misshapen beads. This is due to the inevitable collisions and shearing forces applied to the monomer droplets and the polymerising beads, especially in large-scale commercial processes.

It is known to conduct oil in water emulsion and bead polymerisation processes, using water insoluble monomer or monomer blend dispersed in water, under conditions whereby collisions between the beads during polymerisation can be reduced.

In U.S. Pat. No. 3,922,255 a blend of water insoluble monomers is fed through orifices (the form non-aqueous beads) in the base of a vertical column along with an aqueous medium containing a stabiliser such as gelatin. This aqueous medium and the non-aqueous monomer beads strung together upwardly through the column and thereby form a dispersion of beads in the water in the column. In an example, the time of travel through the column averages 3.5 min. The dispersion is taken from the top of this column through a line and fed to the top of a downwardly extending column heated to a temperature at which polymerisation is initiated.

In EP 67415, water insoluble monomer is fed through a droplet generator into an aqueous suspension medium containing a stabiliser so as to form a suspension of droplets in the aqueous medium. This suspension is then fed through a line to the top of a column where polymerisation is initiated and the aqueous medium flow downwardly at a rate such that the droplets initially reside at the top of the column but sink, co-current with the down flowing liquid, as polymerisation progresses.

Other disclosures of polymerising water insoluble monomer beads to produce narrowly distributed polymer beads include JP 51-150592, EP 271922 and U.S. Pat. No. 4,579,718.

In U.S. Pat. No. 4,444,961 a particular system is described for forming a dispersion of monomer beads in an immiscible liquid. This comprises a perforated plate separating a monomer supply from a vertical column of the immiscible liquid, and a vibrating pump for pulsing beads through the perforated plate into the column. In the preferred embodiments, the monomer is water insoluble monomer and the beads are pulsed into the base of an upwardly flowing column of water. However, it is also proposed that the beads could be counter current to the flow of the column. It is also proposed that a water-soluble monomer blend could be pumped as beads into a column of water immiscible liquid, in similar manner. The monomer droplets flow through this column and emerge from it as a dispersion in the immiscible liquid. The dispersion is then passed through a line into a separate vessel which is separate from the column in which the agitation is provided to maintain a dispersion of the droplets and polymerisation is initiated.

All of the aforementioned methods would result in improving the particle size distribution of beads formed by suspension polymerisation of a water-soluble monomer or monomer blend.

However, the stability of the non-polymerised droplets is not high enough to resist shear stress without undergoing changes in particle size distribution. For instance, in U.S. Pat. No. 4,444,961 the agitation after the droplet formation during polymerisation will cause bead collisions, and in all the described processes the transport of the beads in an immiscible liquid before they are exposed to polymerisation conditions will also result in undesirable bead collisions.

Ruckenstein and Hong in Polymer, volume 36, Number 14, pages 2857 to 2860 have described a method of making highly cross-linked beads by manual method in a test-tube. In three runs this method gave beads having mean particle size of 1.3 to 2.5 mm and a relative standard deviation of 5 to 5.6%, but in a fourth run the starting monomer beads were formed more rapidly and then had a particle size of 0.46 mm and a relative standard deviation of 34%. Thus, the attempt to increase the rate of production is shown to result in very poor product quality.

In this small scale, slow, process for making cross-linked beads, beads of aqueous monomer including sufficient cross-linking agent are ejected onto the top of a 35 cm high column of non-aqueous liquid from a syringe which is shown as being positioned at a considerable height above the top of the column. The liquid in the column is heated to a temperature at which polymerisation will occur in the beads. The beads gradually sink through the column of heated liquid as they polymerise. Partial polymerisation had occurred by the time the beads reached the base of the column, and they were left in the base of the column for two hours in order to complete the polymerisation. Nevertheless, if an inadequate cross-linker had been used, it is believed that coalescence would have occurred. Therefore the process is not applicable to the more lightly cross-linked water swellable polymeric beads or non-cross-linked water-soluble polymeric beads of the type conventionally used. Further, accelerating the process is shown to give poor results and scaling up that process to be capable of commercial production would not be practicable in view of the inevitable collisions that would occur during the short fall down the column if large amounts of monomer are introduced and considering the apparent tendency for stickiness at the bottom of the column unless the beads are very highly cross-linked.

Another process is described in DE 3709921 for producing polymer beads with fairly narrow particle size distribution and in which undesirable coatings (fouling) are not formed on the polymerisation apparatus.

EP 952989 addressed many of the aforementioned disadvantages associated with bead polymerisation of a water-soluble monomer or monomer blend. A process of manufacturing polymer beads was disclosed in which an aqueous solution of water-soluble ethylenically unsaturated monomer or monomer blend in the presence of an initiator is extruded through orifices into a column of non-aqueous liquid as monomer beads. The column of non-aqueous liquid flows counter current to the descending aqueous monomer beads in order to slow their descent. Further, the non-aqueous liquid is at a temperature whereby polymerisation initiates substantially immediately upon contact between the beads and the non-aqueous liquid. This process achieved significant improvements over the aforementioned prior art processes. However, it would be desirable to further improve upon this process. This is especially so in regard to modern commercial scale processes. Preferably, it would be desirable to provide a process which improves upon the particle size distribution and/or product quality. Further, this process tends to suffer the disadvantage of overheating especially at the reaction approaches completion with the consequence that the amount of monomer extruded into the non-aqueous liquid must be restricted to a lower level than may be desirable with the result that the amount of polymer beads that can be formed by this process may be less than desirable. However, it would be desirable to provide a process which allows a greater quantity of polymer beads product to be produced. This is especially so in regard to modern commercial scale processes.

It would be desirable to provide a process which equals or improves upon the particle size distribution, in a process which enables greater production rates and the capacity to provide larger volumes of product. More preferably, it will be desirable to produce large volumes of polymer beads having a more consistent quality. In particular it would be desirable to provide polymer beads of high water solubility and high molecular weight especially polymer beads consistently having desired molecular weights.

According to the present invention we provide a reverse-phase suspension polymerisation process for the manufacture of polymer beads comprising forming aqueous monomer beads of an aqueous solution comprising water-soluble ethylenically unsaturated monomer or monomer blend and polymerising the monomer or monomer blend to form polymer beads while suspended in a non-aqueous liquid, and recovering polymer beads, in which the process comprises providing in a vessel (1) a volume (2) of non-aqueous liquid wherein the volume extends between at least one polymer discharge point (3) and at least one monomer feed point (4), feeding the aqueous monomer or monomer blend as aqueous monomer beads through orifices (5) into, or onto, the non-aqueous liquid to form aqueous monomer beads, allowing the aqueous monomer beads to flow towards the polymer bead discharge point,
subjecting the aqueous monomer beads to polymerisation conditions to initiate polymerisation to form polymerising beads,
wherein the polymerising beads have formed polymer beads when they reach the polymer bead discharge point,
removing a suspension of the polymer beads in non-aqueous liquid from the vessel at the polymer bead discharge point and recovering water soluble or water swellable polymer beads from the suspension.

Suitably the polymerisation conditions can comprise of any conditions that will induce the aqueous monomer or monomer blend to commence polymerising. Suitably this could be by introduction of suitable initiators, for instance redox initiators and/or thermal initiators. Preferably the polymerisation conditions will include subjecting the monomer beads to actinic radiation from at least one actinic radiation source. Suitably the actinic radiation may be any suitable electromagnetic radiation which provides sufficient energy to initiate polymerisation. This may for instance be ultraviolet light, gamma radiation, x-rays or other high energy radiation.

Preferably the polymerisation conditions include subjecting the aqueous monomer beads to ultraviolet light employing at least one ultraviolet light source. The ultraviolet light source may be any suitable ultraviolet light source conventionally used for photochemical or polymerisation reactions.

Examples of suitable ultraviolet light sources include low, medium or high pressure gas discharge lamps, mostly based on mercury vapor doped with iron or other heavy metals in order to tune the wavelength, excited via electrodes or microwaves. Furthermore LEDs, based on different types of semiconducting wide-bandgap materials, such as diamond and III-V nitride, also semiconductors (AlN, GaN, AlGaN, InGaN, AlGaInN, BN). Alternatively, organic compounds could be used as UV source e.g. in an OLED. In addition UV-Lasers, gas (e.g. nitrogen gas or an excimer (e.g. Xe+F)) based Lasers or solid state (e.g. Frequency quadrupled Nd:YAG) based lasers as well as laser diodes can be used as a UV source.

It is more preferred that the ultraviolet light source comprises at least one light emitting diode (LED).

The invention also concerns an apparatus suitable for a reverse-phase suspension polymerisation process for the manufacture of polymer beads from an aqueous solution comprising water-soluble ethylenically unsaturated monomer or monomer blend, in which the apparatus comprises a vessel (1) comprising a monomer feed point (4); a polymer bead discharge point (3), which vessel is suitable for containing a volume of non-aqueous liquid between the monomer feed point and the polymer bead discharge point,
a multiplicity of orifices (5), suitable for the aqueous monomer or monomer blend to be fed through,
a means for feeding the aqueous monomer or monomer blend through the orifices into, or onto, the non-aqueous liquid to form monomer beads,
a means for removing a suspension of aqueous polymer beads in non-aqueous liquid at polymer bead discharge point,
a means for recovering water-soluble or water swellable polymer beads from the suspension,
a means for subjecting the aqueous monomer beads to polymerisation conditions.

As in regard to the process the polymerisation conditions can be any conditions which will induce the aqueous monomer or monomer blend to commence polymerising. The features regarding polymerisation conditions stated in regard to the process also apply to the apparatus.

By bead we mean a globular or otherwise round object. The beads may be substantially spherical or even elliptical. However, it is preferred that the beads are substantially spherical.

The polymer beads removed at the polymer bead discharge point may still be polymerising. However, said polymer beads should desirably be essentially non-coalescent by the time they reach the polymer bead discharge point. By non-coalescent we mean that the beads have a tendency not to stick together to form agglomerates. The polymer beads removed at the polymer bead discharge point may comprise mainly polymer, generally at least 80% polymer and typically at least 90% polymer the remainder of which is formed from monomer and/or other oligomeric or polymerisable species. In some cases the polymer beads removed at the polymer bead discharge point may be substantially fully polymerised with only low residual monomer, for instance less than 2% or below.

Typically the polymer beads removed at the polymer bead discharge point tend to be still polymerising. In this case it is preferred that the suspension of polymer beads removed at the polymer bead discharge point is subjected to a post polymerisation stage. Such a post polymerisation stage may be carried out in a separate vessel optionally using additional initiator systems. Optionally the post polymerisation stage may involve irradiating the polymer beads with ultraviolet light or other radiation sources and/or subjecting the polymer beads to thermal energy.

Unexpectedly, the inventors have discovered that the process of the present invention leads to an efficient way of preparing polymer beads. In the preferred aspect the inventors have found that by using ultraviolet radiation the processes are improved. Further the inventors found that involving UV irradiation of the aqueous monomer beads in which the UV irradiation is from a light source comprising a light emitting diode (LED) provides significant improvements.

The aqueous monomer beads are formed from an aqueous solution comprising water-soluble ethylenically unsaturated monomer or monomer blend. The aqueous solution may consist of dissolved monomer, water and optionally other ingredients such as polymerisation catalysts, for instance polymerisation initiators. Generally the aqueous solution of the monomer or blend of monomers may be at a concentration of up to 75% by weight of the monomer dissolved in water. Usually the concentration of the monomer or monomer blend in the aqueous solution will be less than this, for instance up to 60% or up to 55% or up to 50% by weight. Suitably the concentration of the monomer in the aqueous monomer or monomer blend should be at least 10%, typically at least 20% and usually at least 25% or at least 30%.

It may be desirable for the aqueous monomer or monomer blend to also contain at least one polymer which is suitably dissolved in it. Thus the aqueous monomer beads may comprise dissolved monomer or monomer blend in addition to at least one dissolved polymer. Suitably the at least one polymer is a solution of the same polymer type as the polymer formed in the present process. For instance if the aqueous monomer comprises acrylamide with other comonomers the at least one polymer may be a polymer of acrylamide with the same other comonomers. Alternatively the at least one polymer should be compatible with the aqueous monomer or monomer blend. Suitably the amount of polymer present in the aqueous monomer or monomer blend may be up to 120% of the dry weight of monomer or monomer blend. Typically, where at least one polymer is present the amount will be less than this, for instance up to 100% of the dry weight of the monomer or monomer blend and usually no more than 80%, desirably no more than 60%. Where the at least one polymer is present in the aqueous monomer or monomer blend it may be in an amount which is quite small, for instance at least 0.05% and suitably at least 0.1%, often at least 0.5%, for instance at least 1.0%. The amount of at least one polymer contained in the aqueous monomer or monomer blend may depend upon the desired properties and also the molar mass of the at least one polymer. It may be desirable to employ at least one polymer in the monomer or monomer blend so as to alter the rheological properties of the aqueous monomer or monomer blend and hence the rheological properties of the aqueous monomer beads. In some cases the presence of the at least one polymer may viscosify the aqueous monomer or monomer blend which may reduce the ability of the aqueous monomer beads to deform and/or coalesce. Preferably, however, the aqueous monomer or monomer blend which is fed or extruded and the so formed aqueous monomer beads do not contain polymer.

In a preferred process of the invention the polymer which is obtained is water-soluble. Generally this is made by conducting the polymerisation in the absence of added cross-linker. Accordingly, the process is particularly valuable for the manufacture of polymeric flocculants and viscosifiers.

In other processes the beads can be swellable in water rather than water-soluble. For instance the beads can be cross-linked by polymerising the monomer or monomer blend in the presence of added cross-linking agent. The amount of cross-linking agent can be selected between the values which are relatively low and values which are high. For instance the amount of cross-linking agent can be 100 to 500 ppm up to 1000 to 2000 ppm or more based on weight of cross-linking agent on weight of monomer.

However, in some cases it may be desirable to produce water-soluble polymers by the inclusion of small amount of added cross-linking agent, for instance up to 10 ppm of cross-linking agent based on total polymer, such as up to 8 ppm, or up to 6 ppm or up to 5 ppm; this may be at least 0.1 ppm or at least 0.5 ppm or at least 1 ppm or at least 2 ppm.

The cross-linking agent may be a compound which reacts with pendant groups of monomer units or polymer chain, for instance multi valent metal salts where the monomer or polymer carry a carboxylic acid group. Preferably the cross-linking agent may be a polyethylenically unsaturated compound i.e. a compound with at least two ethylenically unsaturated moieties. Suitably the cross-linking agent may be methylenebisacrylamide, tetra allyl ammonium chloride, polyethylene glycol diacrylate etc.

Desirably the aqueous monomer or monomer blend may be degassed in order to remove oxygen which may otherwise inhibit the polymerisation reaction. In general, this should be done prior to feeding the aqueous monomer or monomer blend through the orifices.

Suitably the degassing of the aqueous monomer or monomer blend may be achieved by mixing it with nitrogen in a mixer. Subsequently the mixture of the aqueous monomer or monomer blend and nitrogen may be flowed into a degassing column. Specifically a thin film of the aqueous mixture can be formed on the walls of the degassing column, from which the nitrogen and any entrained oxygen can be released into the offgas and/or monomer or monomer blend. Suitably the degassing column walls may be constructed of glass or at least have a glass lining. The degree of deoxygenation can be monitored by detecting the amount of oxygen in the offgas using an oxygen sensor. The amount of nitrogen mixed in the aforementioned mixture can then be adjusted as appropriate. The degassing may be carried out according to the teachings of WO 03/066190.

By feeding the aqueous monomer or monomer blend through the orifices this may also be regarded as extruding. Such an extrusion of the monomer may tend to form a stream of monomer liquid and/or monomer beads. Where a stream of monomer is formed the stream may then break into individual monomer beads In the invention, the aqueous monomer or monomer blend is fed into or onto the non-aqueous liquid. The aqueous monomer or monomer blend should be fed or extruded as individual monomer beads having a desired size. Where the aqueous monomer or monomer blend is fed or extruded onto the non-aqueous liquid desirably this should be done not shatteringly onto the non-aqueous liquid. By this we mean that the monomer bead does not break up on contact with the non-aqueous liquid.

The aqueous monomer beads flow towards the polymer bead discharge point. The direction of flow should be in an upwards direction when the polymer bead discharge point is above the monomer feed point. When the direction of flow is upwards desirably the density of the monomer beads should be lower than the density of the non-aqueous liquid. Further, in this case it would be generally desirable for the direction of flow of the non-aqueous liquid to the upwards. The ascending aqueous monomer beads suitably may be initiated by subjecting to polymerisation conditions, involving the action of actinic radiation, preferably UV radiation and more preferably from at least one LED light source, in order to induce polymerisation. The direction of flow should be in a downwards direction when the polymer bead discharge point is below the monomer feed point. It is preferred that the direction of flow is downwards.

When the direction of flow is in a downwards direction the aqueous monomer beads should desirably fall gradually and independently through the non-aqueous liquid. The descending aqueous monomer beads are initiated by the action of actinic radiation, preferably UV radiation and more preferably from at least one LED light source, in order to induce polymerisation.

Suitably the non-aqueous liquid may be admitted to the vessel by any suitable means, for instance an inlet port.

The non-aqueous liquid may be flowing in an upward direction or alternatively in a downward direction or in some cases it may be desirable for the non-aqueous liquid to be substantially non-flowing. When the non-aqueous liquid is substantially non-flowing suitably it may be essentially stationary and non-agitated. Desirably any movement of the non-aqueous liquid should be substantially non-disruptive to the monomer beads or the polymerising beads.

Thus when the non-aqueous liquid is flowing either in an upward direction or in a downward direction desirably it should be substantially non-disruptive. By this we mean that the flow of non-aqueous liquid does not disrupt the individual integrity of the monomer beads which are descending through the column of non-aqueous liquid. Therefore the flow should be sufficiently non-turbulent that it does not cause unacceptable collisions of the monomer beads or polymerising beads especially while they are sticky and falling through the column of non-aqueous liquid. The flow should be sufficiently non-disruptive such that it does not cause shearing of the beads into small particles while they are flowing down through the column. Conveniently therefore the flow can be considered to be substantially non-turbulent. In some cases it may be desirable that the flow is sufficiently non-turbulent (that is substantially laminar flow). However, there can still be a small amount of non-laminar flow within the non-aqueous liquid due to convection effects with the consequential formation of swirls or eddies. Generally these can be tolerated provided that the collisions between the aqueous monomer beads and/or polymerising beads are avoided within an acceptable level. In general the beads which are flowing through the non-aqueous liquid will follow a substantially rectilinear downward or upward path and will not encounter forces having a sufficient transverse component as to promote significant coalescence of the beads as they flow.

The volume of non-aqueous liquid may be formed in a suitable vessel. Suitably the volume of non-aqueous liquid may be in the form of a column which extends between the polymer bead discharge point and the monomer feed point.

Typically the volume or column of non-aqueous liquid may have a cross-sectional diameter which is less than the height. Nevertheless, it may be desirable in some instant studies for the cross-sectional diameter to be the same or greater than the height.

In general the volume of column of non-aqueous liquid is usually wholly vertical but it can be slightly inclined provided the flow profile is such that the beads do not significantly impact on to and coalesce against the walls of the vessel.

The column may be formed in any suitable upright vessel which may for instance be a tubular substantially vertical reaction vessel. The vessel should be free of baffles or other turbulence introducing features. Preferably the walls of the vessel are substantially smooth and parallel or taper outwardly or inwardly at an angle which is sufficiently low to avoid promoting turbulence.

The flow rate of the non-aqueous liquid, whether in a upwards direction or a downwards direction, may be adjusted in such a way to control the rate of descent of the beads to a period which is within the range of about 0.5 or 1 min to about 30 min and which is sufficient (having regard to the initiator and other polymerisation conditions) for the beads to be substantially non-coalescent when they reach the base of the column. By non-coalescent we mean that the beads have a tendency not to stick together to form agglomerates.

When the polymerising beads are descending the rate of flow may be such that the duration of the descent of beads is at least about 0.5 min, and usually at least 1 min. In general, depending upon the rate of polymerisation, this may be required to ensure that sufficient time is given for the polymerisation to proceed sufficiently, before the beads reach the base of the vessel, or the beads to be substantially non-coalescent by the time they reach the base of the vessel. Furthermore it may be desirable to conduct the process using a polymerisation which takes a significant time to go to completion, rather than a polymerisation which achieves near completion, within a few seconds. This is because, as a generality, improved polymer properties tend to be obtained with slower polymerisations than with quicker polymerisations, especially when making high molecular weight water-soluble polymers or other useful polymers in accordance with this invention. In general, if the duration of fall is, for instance significantly less than about 0.5 min then it is likely that either significant coalescence may occur at the base of the vessel or that the polymerisation may have to be arranged to progress so rapidly as to risk producing an inferior polymer, or both.

The size of the polymer beads which are ultimately formed will be determined generally as a result of the choice of monomer extrusion conditions (for instance the size of the orifices). In addition the polymer bead size may be influenced by how the monomer beads are introduced into the non-aqueous liquid. Preferably the avoidance of shattering of the beads into or closely onto the non-aqueous liquid may avoid undesirable variations to the particle size. Further, it is preferred that where the non-aqueous liquid is flowing either upwards or downwards that the flow is substantially non-turbulent which may risk undesirable collisions and/or coalescence of the monomer beads or polymerising beads.

A further significant factor in the control of the particle size is the control of the polymerisation. The inventors have discovered that by employing a photo polymerisation process which uses an LED lamp or LED lamps as the UV source allows more significant control of this process of producing polymer beads. This is also believed to be beneficial in the avoidance of undesirable particle size variations by coalescence. It would seem that this process more consistently leads to resulting polymer beads which are less sticky. Furthermore, the inventors have discovered that employing the LED ultraviolet light source enables an improved control over the light intensity and the wavelength distribution. The inventors have discovered that this enables a better control of the polymerisation in the process of the present invention.

Examples of suitable materials for use in ultraviolet light emitting diodes (LED) include wide bandgap materials, such as diamond and III-V nitride semiconductors, for instance AlN, GaN, AlGaN, InGaN, AlGaInN, BN. Alternatively, it may be possible to employ certain organic compounds which could be used as a UV source, for instance in an OLED.

In the process where the direction of flow of the monomer beads is downwards the monomer beads are introduced into the volume or column of non-aqueous liquid at the monomer feed point which is at or near the top of the volume or column of non-aqueous liquid. Non-aqueous liquid may be above the monomer feed point, for instance as a result of a monomer bead extrusion device being provided in the centre of the upright vessel and non-aqueous liquid being located around it. Often, however, the monomer feed point is at the top of the column in that when the non-aqueous liquid is not flowing the top of the column is the highest point of the non-aqueous liquid or when the non-aqueous liquid is upflowing this is the point at which the non-aqueous liquid is deflected from a substantially vertical flow to a horizontal flow or other direction which allows it to be removed from the vessel or when the non-aqueous liquid is down flowing this is the point at which the non-aqueous liquid flows from a horizontal or other direction and then starts to flow substantially vertically downwards which in general allows the non-aqueous liquid to enter the vessel. In many situations the monomer feed point may represent the highest point of the column of non-aqueous liquid in the vessel and generally this may be irrespective of whether the non-aqueous liquid is flowing or substantially non-flowing.

In the preferred case when the direction of flow is downwards the discharge of the aqueous monomer beads into or onto the non-aqueous liquid may be at this monomer feed point or it may be at some position distant from it provided that position is above and is in sufficiently close and substantially non-disruptive non-aqueous liquid communication with the monomer feed point. Thus the monomer feed point may be a point at which the volume or column of non-aqueous liquid is deflected laterally when flowing upwards or flows from a lateral direction and then deflected substantially vertically when flowing downwards and in both instances there can be a short vertical column above this in which little or no up flow or down flowing occurs but down which the beads can fall through non-aqueous liquid in a substantially non-turbulent manner without coalescence.

More preferably the non-aqueous liquid flows in a downwards direction i.e. co-current with the direction of flow of the monomer beads. This has been found to be particularly advantageous when the aqueous monomer or monomer blend is fed or extruded into the non-aqueous liquid.

The extrusion of the aqueous monomer or monomer blend as monomer beads through orifices may be conducted in any suitable manner for forming a plurality of beads of predetermined size from a fluid liquid. The orifices generally have a diameter in the range 0.05 to 2 mm. There may be a plurality of extrusion needles each of which is provided with a pulsed supply of liquid or there may be a perforated grid/plate provided with a pulsed supply of liquid.

It is generally preferred that the extrusion orifices are located at the surface or beneath the surface of the non-aqueous liquid, i.e., so that the monomer beads are fed or extruded direct from the orifices into the non-aqueous liquid. Feeding or extrusion from orifices above the non-aqueous liquid can, however, be tolerated provided the drop distance is sufficiently small that the beads of monomer do not shatter or otherwise significantly distort when they impact on the surface of the non-aqueous liquid. Generally, the orifices should not be located more than 20 mm, and preferably not more than 10 mm, above the surface of the liquid. Nevertheless, in some instances it may be desirable for the extrusion orifices to be located more than 20 mm above the surface of the non-aqueous liquid.

Preferably the aqueous monomer or monomer blend is fed or extruded into the non-aqueous liquid. The individual monomer beads may not necessarily form immediately as the fed or extruded monomer enters the non-aqueous liquid. Instead a multiplicity of streams of fed or extruded monomer may initially enter the non-aqueous liquid from a multiplicity of orifices and then subsequently break into the individual monomer beads. In some cases the monomer beads may form as the fed or extruded monomer exits at least some of the orifices. In certain cases the monomer beads may form as the fed or extruded monomer exits substantially all of the orifices. Suitably, however, a multiplicity of streams of fed or extruded monomer may enter the non-aqueous liquid from substantially all of the orifices, for instance at least 95%, particularly at least 99% and usually 100% of the orifices, and then subsequently the fed or extruded streams of monomer breakup into individual monomer beads.

Desirably the orifices are disposed in at least one plate or at least one grid. Therefore the process may employ a multiplicity of orifice containing plates and/or orifice containing grids. Preferably one plate or one grid is employed. More preferably a single plate is employed in which a plurality of orifices is disposed.

Preferably the orifices may be comprised in a droplet generation head. The droplet generation head may be so adapted as to deliver a pulsated flow of aqueous monomer or monomer blend. The frequency of the pulsations may be between 100 and 1000 Hz, for instance from 300 to 750 Hz. Therefore the flow of monomer through the orifices may be subjected to pulsed variations in pressure. For instance, part of the chamber may be defined by a diaphragm which is caused to vibrate at the desired frequency, for instance by means of electromagnetic vibration or using a piezoelectric device. However, preferably the droplet generation head is so adapted as to deliver a constant flow of aqueous monomer or monomer blend i.e. not subject to a pulsated flow or pressure variations.

The size of the aqueous monomer beads is selected so as to provide final dry polymer beads of whatever size is desired, for instance having a weight average size in the range 30 µm to 3 mm, and often between 0.1 mm and 2 mm. Usually all the orifices are substantially the same size and usually all discharge from the single supply chamber, and thus all discharge under the same pressure. In some cases, particularly where a relatively large number of orifices are employed, it may be desirable to use multiple supply chambers. Alternatively a single supply chamber may be employed which has several inlets into it. Generally the discharge pressure should be substantially the same for all of the orifices even where multiple supply chambers are employed. Accordingly the initial aqueous monomer beads are preferably all substantially the same size. In general, the ejected aqueous monomer beads are usually as uniform as possible, for instance at least 90% by weight within 15 to 30% of the weight average size. Often the size distribution is significantly less than this, for instance as discussed in more detail below.

The process may be facilitated by the presence of suitable stabilisers or protective colloids which may help to prevent coalescence of the monomer beads or polymerising beads. The stabilisers or protective colloids may be surfactants or polymeric materials conventionally used for making polymer beads by reverse-phase suspension polymerisation. Generally the stabiliser may be an amphipathic stabiliser. Preferably the process is facilitated by the presence of amphipathic polymeric stabiliser in the non-aqueous liquid. The amount can be less than the amount which is normally required for a conventional suspension polymerisation and the amount of active polymeric stabiliser may be generally at least 0.01% based on the weight of non-aqueous liquid, for instance at least 0.05% or at least 0.1% and in some cases at least 0.3% or at least 0.5% or at least 1.0%. The amount of active polymeric stabiliser may be as much as 10% based on the weight of non-aqueous liquid, for instance up to 5.0% or up to 2.0%. In some cases it may be up to 1.0% or up to 1.0% or up to 0.5%. Suitable polymeric stabilisers are copolymers of water-soluble ethylenically unsaturated monomers, such as methacrylic or acrylic acid or dialkyl amino alkyl (meth) acrylate salt, and water insoluble ethylenically unsaturated monomers such as styrene and/or fatty alkyl acrylates or methacrylates. Block copolymers (including multiblock copolymers, such as diblock or triblock copolymers) such as the copolymer of polyethylene glycol and hydroxy stearic acid can be used, all as is conventional for reverse-phase suspension polymerisation of water-soluble monomers to provide polymer beads of water-soluble or water swellable polymers.

The non-aqueous liquid can be any conventional hydrocarbon or other non-aqueous liquid such as any of those known for use in reverse phase polymerisations. For instance, it may be an aliphatic, cycloaliphatic or aromatic hydrocarbon, typically having a boiling point of between 140° C. and 350° C. Suitable non-aqueous liquids include D40, D80, D100, Isopar G, Isopar H by companies such as Exxon Mobil, Shell Chemicals or others. The non-aqueous liquid should be chosen so as to allow the passage of the appropriate wavelengths of radiation chosen for polymerisation.

The time required for the monomer beads to polymerise sufficiently that they become non-coalescent, while still dispersed in the non-aqueous liquid, is dictated by the choice of the monomer or blend of monomers, the initiator system and the polymerisation conditions in the vessel, such as the temperature, the wave length of the ultraviolet light and the intensity of the ultraviolet light.

The rate of descent or assent of the beads (i.e. as monomer beads and polymerising beads), and thus their times of travel, depends on the size and composition of the beads, the rate and direction of flow, and the choice of flowing liquid (for instance, viscosity and especially the differential between the specific gravities of the beads and the liquid). Viscosifier can be included to increase the viscosity of the nonaqueous liquid but this is usually avoided.

As to whether or not the column of non-aqueous liquid is substantially static or flowing and if so the rate of upward flow or downward flow will depend upon the relative specific gravities of the aqueous monomer beads and the polymerisation conditions and desirably should be selected in a known manner such that the monomer beads polymerise to a substantially non-coalescent state before they reach the bottom of the column. As already stated it is preferred that the column of non-aqueous liquid flows in a downwards direction i.e. co-current with the direction of flow of the beads.

Preferably the period of time for the monomer beads to reach the bottom of the column as non-coalescent polymer beads should be not more than 45 min and preferably not more than 30 min and is usually not more than 25 min. Preferably the period is at least 30 seconds and often at least 1 min and usually may be within the range of between 1 or 2 min and 5 or 10 min. In many cases it may be considered undesirable to polymerise too quickly, since this may impact on the final molecular weight of the polymer beads. Therefore it is normally preferred to polymerise for at least 10 seconds before the polymer beads become non-coalescent and frequently the polymerisation may need to be conducted for at least 20 seconds or 30 seconds before the non-coalescent state is achieved.

It may be desirable that there is a substantially static column of non-aqueous fluid down through which the beads fall before reaching the column of flowing nonaqueous liquid. This static column of non-aqueous liquid may occupy a few seconds, for instance up to 10 or even 20 seconds or more in some processes, and so this will add to the total polymerisation time. Preferably, however, such a static column of non-aqueous liquid is not employed.

The rate of flow (upward flow or downward flow) of the non-aqueous liquid through the vessel is usually at least 0.2 cm/sec and preferably at least 0.4 cm/sec. Suitably, it is not more than 3 cm/sec but speeds of up to 10 cm/sec or higher may be achievable in some processes. Preferably the flow rate is not more than 2 cm/sec, more preferably not more than 1.5 cm/sec, for instance below 1 cm/sec. The respective rates of flow correspond to at least the main part of the vessel, for instance at least 90% of the vessel. Often as the non-aqueous liquid containing the dispersed polymer beads approaches the polymer bead discharge point the vessel narrows with the result that the rate of flow inherently increases. Sometimes this increased flow rate may be at least twice and in some cases at least five times the flow rate in the main part of the vessel. A particular advantage of the invention is that it is easily possible to adjust the speed of flow (for instance merely by adjusting the rate of pumping of the non-aqueous fluid through the apparatus) and where necessary adjusting the rate of flow of the aqueous monomer or monomer blend through the orifices. When adjusting the speed of flow it is usually necessary to adjust the respective rates of flow for the non-aqueous liquid and monomer in order to maintain a desired concentration of polymer beads dispersed in the non-aqueous liquid. Therefore it is easily possible to change the rate of descent or assent of the monomer beads and polymerising beads subject to the desired polymerisation conditions, such as variations in the feed (for instance changes in the monomer or monomer blend or in the initiator or temperature) or rate of supply of monomer feed or desired end product (for instance molecular weight).

It may be desirable that the rate of flow at the top of the column or volume of non-aqueous liquid (and down through which the monomer droplets fall) should be less than the rate of flow throughout the main length of the column. This can be especially the case when the volume or column of non-aqueous liquid is flowing upwards. Thus there can be a static head of fluid at the top of the column or, more usually, the rate of flow in the topmost section of the volume or column is less than 90% and often less than 70% of the rate of flow throughout the central part of the column. Usually it is at least 20% of the rate of flow through the central part of the volume or column, for instance above 40%. When the volume or column of non-aqueous liquid is flowing upwards one reason for having a static or slower flow at the top of the column is that the monomer droplets tend to have a lower specific gravity than the droplets once polymerisation has progressed significantly. In this case by arranging for the flow to be less at the top, sedimentation of the beads occurs at the top of the volume or column even though the rate of upflow lower down the column (selected to give the desired sedimentation of the polymerising beads) is sufficiently high that it would (if applied to the monomer beads) be liable to carry the monomer beads upwardly and out of the volume or column.

In some situations it may be desirable that the rate of flow at the top of the volume or column (and through which the monomer droplets fall) should be greater than the rate of flow throughout the main length of the volume or column. This can be especially the case when the volume or column of non-aqueous liquid is flowing downwards. Thus the rate of flow throughout the central part of the volume or column can be less than 90% and sometimes less than 70% of the rate of flow throughout the topmost section of the volume or column. Often it is at least 20% of the rate through the topmost section, for instance above 40%. When the volume or column of non-aqueous liquid is flowing downwards a reason for having a greater flow at the top of the volume or column is in view of the tendency for monomer droplets to have a lower specific gravity than the droplets once polymerisation has progressed significantly.

The top part of the vessel should desirably be designed in a way that, especially when the monomer is injected into the non-aqueous liquid, swirls and convection effects causing droplet collisions with other droplets or the droplet generator are minimised. This is usually done by a wider top part of the vessel. Thus up to 5 or 10% of the top part of the vessel may desirably be wider than at least 60% or at least 70% or at least 80% and up to 90% for up to 95% of the remaining part of the vessel.

Preferably in the process of polymerisation a photoinitiator is included in the process and the monomer beads are subjected to UV (ultraviolet) irradiation from a UV source comprising an LED. The UV source may comprise at least one LED array. Preferably, the wall or walls of the vessel comprise a portion which allows the transport of UV light, which may be regarded as an ultraviolet light translucent or ultraviolet light transparent portion and the light source comprising the LED is mounted externally such that UV radiation from the light source penetrates the vessel. A combination of two or more initiation techniques may be used. For instance, it may be desirable to employ a combination of redox initiation and photoinitiation, such as UV initiation; or for instance either redox initiation and/or photoinitiation in combination with thermal initiation.

Suitably the light source may be in communication with an external surface of a portion which allows the transport of UV light, which may be regarded as an ultraviolet light translucent or ultraviolet light transparent portion of the vessel. Preferably the light source is mounted at a distance of up to 10 cm from the external ultraviolet light translucent or ultraviolet light transparent surface of the vessel, more preferably within a range of 0.1 and 5.0 cm. The UV translucent or UV transparent portion of the vessel may be formed from a suitable material which is substantially translucent or transparent to UV light. For instance, this material may be glass or plastic. Suitable glass materials include quartz glass and borosilicate glass.

Where the light source is generally light of another wavelength, for instance visible light, and is used in conjunction with a suitable photoinitiator which is active in said light source, for instance the visible spectrum, it may be desirable to use other materials which allow the transport of said light source of another wavelength, i.e. translucent or transparent to said light wavelength. For instance, in the case of light in the visible spectrum in may be desirable to use for instance, soda lime glass, aluminosilicate glass or lead glass to construct at least a portion of the vessel wall.

Additionally other materials which may be used for a portion of the vessel wall which allow the passage of actinic radiation include polymeric materials, such as polydimethylsiloxane, polyvinylidene fluoride, polymethylpentene, polystyrene, polyvinyl chloride all which may at least allow the passage of sufficient of the actinic radiation. Other possible materials include sapphire or amorphous metals which are transparent or translucent for some wavelengths of actinic radiation.

More preferably still the vessel comprises a wall or walls which comprise borosilicate glass. Alternatively, the LED UV light source may be mounted inside the reactor vessel. For instance, at least one LED UV light source may be mounted on the interior wall of the reactor vessel. It may also be desirable for the LED UV light source to be suspended inside the reactor, for instance from the top or the base of the reactor. Preferably, the UV radiation is UVA radiation, particularly with a frequency of 340 to 380 nm, for instance between 360 and 370 nm.

The intensity of the actinic radiation, for instance UV light, may be in the range of 5 to 1000 mW/cm$^2$, desirably 10 to 1000 mW/cm$^2$, for instance within the range of 30 to 100 mW/cm$^2$.

The vessel in which the process is conducted may be any convenient shape and size which allows the monomer beads to descend through the non-aqueous liquid such that suitably non-coalescent polymer beads are formed. It may be desirable for the vessel to have flat wall or walls and for instance comprise a horizontal cross-section which is triangular, square, rectangular, or other polygonal shape such as pentagonal, hexagonal, heptagonal or octagonal etc. Alternatively, it may be desirable for the vessel to have curved wall or walls and for instance comprise a horizontal cross-section which is circular, elliptical or oval etc.

It may also be desirable for the vessel to comprise a further wall or set of walls within the boundary defined by a first wall or walls. Thus the vessel may comprise an outer wall or walls and an inner wall or walls and the non-aqueous liquid is contained in the space between the outer wall or walls and the inner wall or walls. Preferably the vessel comprises an outer circular wall or walls and an inner circular wall or walls and in which the horizontal cross-section defines two concentric circles with an annular gap between the inner wall or walls and the outer wall or walls. In this preferred form of the process the non-aqueous liquid is contained in the annular gap which is defined by the inner wall or walls and the outer wall or walls. In one form of this preferred aspect of the invention the UV source is located external to the outer wall. In a further form the UV source is located external to the inner wall. In both scenarios the UV source would be located external to the reaction medium. It may also be desirable for the UV source to be located external to both the inner wall and outer wall. Thus the vessel may comprise an LED light source in communication with the external surface of the outer wall or walls and/or inner wall or walls of the vessel. More preferably at least one LED array is mounted externally to the inner wall or walls and/or outer wall or walls.

The vessel may be of any suitable dimensions. Typically the vessel may have a height of up to 25 m or more but is usually no more than 20 m, for instance up to 15 m for up to 10 m. Suitably the vessel may have a height of at least 2 m and usually more, for instance at least 3 m or at least 5 m. Suitably the cross-section of the vessel may be up to 5 m or more but is usually no more than 3 m in diameter. Usually the cross-section of the vessel should be at least 0.25 m and often may be at least 0.5 m, for instance at least 1.0 m or at least 1.5 m. Where the cross-sectional diameter is different across perpendicular planes, for instance in the case of a vessel which has a rectangular cross-section, the two cross-sectional diameters may for instance be chosen from any value within the aforesaid range given in regard to the cross-sectional diameter. Where the vessel consists of two concentric cylinders, the cross-sectional diameter of the inner cylinder may be at least 0.1 m, for instance at least 0.2 m or at least 0.5 m. The inner cylinder may have a cross-sectional diameter much larger than this provided that it is less than the outer concentric cylinder and allow sufficient volume between the two cylinders to enable the process to be conducted. In general the inner concentric cylinder may have a cross-sectional diameter of up to 4.5 m, for instance up to 4 m or even up to 3.5 m, such as no more than 3 m. Suitably the cross-sectional diameter of the inner cylinder may be between 0.5 m and 2.5 m, for instance between 0.6 m and 2.0 m, such as between 0.7 m and 1.2 m. Desirably the outer concentric cylinder should have a cross-sectional diameter which is up to 3 m greater than the cross-sectional diameter of the inner cylinder, for instance up to 2.5 m or up to 2 m. Often the outer concentric cylinder may have a cross-sectional diameter which is at least 0.05 m greater than that of the inner cylinder, for instance at least 0.1 m greater.

The process and apparatus of the present invention may comprise a single vessel. Nevertheless it may be desirable to employ a multiplicity of vessels connected in parallel. In such cases the number of vessels employed may depend upon the quantity of polymer beads to be prepared simultaneously. For instance, it may be desirable to employ up to 30 vessels or more in parallel. Typically the number of vessels may be up to 20 or 25 vessels, for instance up to 15 vessels. Where a multiplicity of vessels are employed the number of vessels may be at least 2 or more, for instance at least 3 vessels or at least 5 vessels in parallel.

Where a multiplicity of vessels (1) are used in the apparatus of the present invention in may be desirable for the polymer beads discharged from the polymer be discharge point of all or some of the vessels (1) to be directed into a single post-polymerisation vessel. Nevertheless it may be desirable that the polymer beads discharged from the multiplicity of vessels (1) are fed into two or more post-polymerisation vessels connected in parallel.

The vessel may be constructed of at least one corrosion stable material, for instance alloy steels containing nickel, chromium, molybdenum, vanadium, silicon already combinations thereof or glass etc. The vessel may be constructive of a combination of materials, for instance alloy steel with glass sections. In addition the vessel may also be lined with a suitable material such as glass and/or other materials which impart corrosion resistance or antifouling properties.

The photoinitiator may be any photoinitiator suitable for conducting photo polymerisation of ethylenically unsaturated monomers, especially water-soluble ethylenically unsaturated monomers. Suitable initiators for UV polymerisation used in accordance with the present invention include one or more of the compounds selected from the group, 2-Hydroxy-2-methyl-1-phenyl-propan-1-one, 1-[4-(2-Hydroxyethoxy)-phenyl]-2-hydroxy-2-methyl-1-propane-1-one, 50% 1-Hydroxy-cyclohexyl-phenyl-ketone (IRGACURE 184), 50% Benzophenone, Bis(2,4,6-trimethylbenzoyl)-phenylphosphineoxide, 40-70% oxyphenyl-acetic acid 2-[2 oxo-2-phenyl-acetoxy-ethoxy]-ethyl ester, 30-60% oxy-phenyl-acetic 2-[2-hydroxy-ethoxy]-ethyl ester, Phenyl glyoxylic acid methyl ester, Ethyl-2,4,6-Trimethylbenzoylphenylphosphinate, 2,2'-Azobis(N,N'-dimethyleneisobutyramidine) dihydrochloride, 2,2'-Azobis(2-amidinopropane) Dihydrochloride, 2,2'-Azobis{2-[1-(2-hydroxyethyl)-2-imidazolin-2-yl]propane}dihydrochloride, 2,2'-Azobis(1-imino-1-pyrrolidino-2-ethylpropane)dihydrochloride, 2,2'-Azobis[2-methyl-N-(2-hydroxyethyl)-propionamide], 4,4'-Azobis(4-cyanovaleric acid), and 2,2'-Azobis (2-methylpropionitrile. Preferred UV initiators include azo compounds, especially those which are water-soluble. A particularly suitable photoinitiator is V50 which is 2,2'-azo bis(2-methyl propionamidine)dihydrochloride.

The photoinitiator may be present in the non-aqueous liquid and/or aqueous monomer or monomer blend but preferably would be present in the aqueous monomer or monomer blend only. Where the photoinitiator is present in the non-aqueous liquid it may be added at the monomer feed point or alternatively added to the non-aqueous liquid at any stage prior to the monomer feed point provided that the photoinitiator is not exposed to any UV light prior to the monomer feed point. In a preferred form of the invention the photoinitiator is dissolved in the aqueous monomer or monomer blend suitably prior to the extrusion of the monomer through the orifices. Typically the photoinitiator may be included at the stage where the aqueous monomer or monomer blend is made up or alternatively photoinitiator may be added as the aqueous monomer or monomer blend is flowed towards the orifices.

One advantage of the present process over the prior art, especially over the process of EP 952989 is that the reaction can be started at a relatively ambient temperature or even a cold temperature. For instance the non-aqueous liquid and monomer beads contained therein at the start of the reaction may be at a temperature below 30° C., preferably below 25° C., for instance below 20° C. Usually the temperature is at least −5° C. and usually at least 0° C. The temperature of the aqueous monomer fed or extruded into the non-aqueous liquid may be between −5° C. and 25° C., for instance between 0° C. and 20° C., such as between 5° C. and 15° C. The non-aqueous liquid as it enters the column should desirably have a temperature below 30° C., for instance below 20° C.

In a preferred aspect of the process by starting the process at a cooler temperature of the non-aqueous liquid the reaction may approach completion without the risk of overheating. Suitably by starting the polymerisation at a relatively cooler temperature improved product properties are achieved, such as higher polymer molecular weight and improve linearity (i.e. reduced branching). The process may be conducted adiabatically or isothermally. By adiabatically we mean that the temperature of the reaction medium rises at least by 50° C. and usually at least 60 or 70° C. over the course of the reaction. By isothermally we mean that there is essentially no temperature difference of the reaction medium over the course of the reaction. In some cases the process may be somewhere in between isothermal and adiabatic, for instance a temperature rise of the reaction medium between 0 and below 50° C. over the course of reaction.

Preferably the column of non-aqueous liquid leads downwardly to a discharge point at which the beads collect after they have reached the non-coalescent state. For instance, a substantially non-coalescing skin tends to form around each bead or the entire bead will have become non-coalescing. Accordingly, by the time the beads reach the polymer bead discharge point, it is possible to expose them to turbulence and agitation without significant risk of coalescence between the beads. As mentioned above the rate of flow of the non-aqueous liquid tends to be faster at the polymer bead discharge point than above it, since the vessel and therefore the column of non-aqueous liquid tends to narrow at the polymer bead discharge point. Accordingly the bottom of the column can be dimensioned so as to produce a faster rate of flow. For instance the rate of flow over the bottom 3 to 20%, usually 3 to 10%, of the total length of the column can be more than at higher points in the column for instance, this can be at least 1.5 times the rate of flow at the higher parts of the column, suitably at least twice and in some cases at least four or five times the flow rate at the higher parts of the column. It may be as much as 20 times when usually not more than 10 times the flow rate at the higher part of the column.

The suspension of polymer beads, which are preferably non-coalescent, which is removed from the column at the discharge point can be a suspension of fully polymerised beads, in which event the final beads can be recovered from it, but generally the beads are subjected to further bead polymerisation conditions in a suitable polymerisation vessel. This may be at the base of the column but can be any suitable vessel to which the suspension can be transferred. Transfer may be by pumping or by merely dropping into the vessel, for instance through a valve. If full polymerisation is to be achieved in the column, the fall time in the column must be sufficiently long to permit this. Generally the fall time in the column is not more than 30 minutes, and a post-polymerisation stage is then usually desirable. If further polymerisation is required this may be achieved by maintaining the same polymerisation conditions after removal of the suspension from the column. Alternatively the polymerisation conditions applied after suspension has passed through the polymer bead discharge point may be different from the polymerisation conditions employed in the column.

The post polymerisation conditions to which the beads are exposed in the post polymerisation stage (after discharge from the vessel) can be conventional conditions in which the suspension of beads in non-aqueous liquid is subjected to agitation in conventional manner so as to keep the beads in suspension in the non-aqueous liquid. The post polymerisation may be carried out in any suitable post polymerisation vessel. It may be desirable for such a post polymerisation vessel to be the same as the vessel employed in the main polymerisation reaction. For instance the polymer beads may be fed into the post polymerisation vessel and allowed to flow, either in an upwards or a downwards direction, through the non-aqueous liquid towards a bead discharge point. In this case the post polymerisation vessel would not be agitated or stirred. Alternatively it may be desirable for such a post polymerisation vessel to contain internal baffles or static mixers.

Preferably, the post polymerisation vessel may be at least one continuous stirred tank reactor (CSTR). One type of CSTR which may be employed is described in WO 02/49756 in which the polymer beads dispersed in the non-aqueous liquid may enter a column through an inlet tangentially in which the column contains a central rotating element wherein the dispersion of polymer beads is subjected to post polymerisation conditions before being fed through an outlet tangentially. Alternatively, other types of CSTRs, for instance containing central stirrers or impellers, may be employed as the post polymerisation vessel in which a dispersion of the polymer beads is injected through one end of the CSTR and subjected to post polymerisation conditions before being fed out of the vessel through a polymer bead discharge point. It may be possible to use a cascade of such CSTRs connected in series, for instance at least 2 or at least 3 and possibly up to 10 or up to 15 or more.

One particularly suitable type of post polymerisation vessel includes a CSTR which may be equipped with turbine agitators and heating jackets. Suitably the internal temperature may be for instance between 70 and 90° C. in combination with an internal pressure of between 50 and 300 mb, for instance between 50 and 200 mb. Where a cascade of CSTRs connected in series are employed, the transfer between each CSTR may be done by overflow pipes. Within such one or more CSTRs some of the water contained within the polymer beads and optionally a portion of some of the continuous phase liquid may be distilled off.

In general the removal of water from the polymer beads in the post polymerisation vessel desirably should achieve polymer beads that contain less than 20% residual water, for instance between 5 and 15% residual water. It may be desirable to remove further residual water from the polymer beads using other techniques such as evaporation.

The overall polymerisation conditions are generally such that the total period between introducing the monomer into the non-aqueous liquid and completion of polymerisation is between about 30 min and 3 hours, more usually between about 60 min and 1.5 or 2 hours and usually under elevated temperatures.

The process can be conducted in a batch type process but preferably the process is substantially continuously with the result that there is a substantially uniform residence time in the process for all the material which is being polymerised.

Nevertheless, in some cases it may be desirable to carry out the process batchwise, wherein during each batch there is continuous addition of monomer until all the polymer has been added, there is continuous flow of non-aqueous liquid until all the beads have fallen through it, and the final polymerisation is conducted for sufficient time to ensure that full polymerisation has occurred of the beads which were introduced last. Preferably, the separation of the polymer beads is done under ambient conditions. By ambient conditions we mean at a temperature of between 15 and 30° C., for instance between 15 and 25° C.

The non-aqueous liquid usually needs to be purged with nitrogen before entering the vessel and conveniently this is conducted during the introduction or recycling of the non-aqueous liquid to the column. Where the flow is upwards the non-aqueous liquid would be returned to the base of the column and where the flow is downwards the non-aqueous liquid would be returned to the top of the column.

The recovery of polymer beads from the polymerisation suspension typically involves separating the beads from the non-aqueous liquid. Preferably such recovery also involves removing the water before separating the polymer beads from the non-aqueous liquid. Preferably it also involves removing unreacted monomer.

Preferably the polymer beads in non-aqueous liquid are subjected to distillation optionally under reduced pressure (i.e., distillation which removes water, volatile unreacted monomer and non-aqueous liquid). After distillation to reduce the water content to, for instance, below 10% by weight of the beads, they may then be separated from the residual non-aqueous liquid by filtration or centrifugation and may then be subjected to further drying, for instance fluid bed drying.

The process of the present invention enables a greater quantity of polymer beads to be manufactured than capable in the process of EP 952989. In fact, the process of the present invention enables a significantly higher concentration of polymer beads to be manufactured simultaneously. Suitably, the suspension of the non-coalescent polymer beads in the non-aqueous liquid removed at the polymer bead discharge point should have a concentration of at least 10% polymer beads on total weight of suspension. Desirably the concentration may be at least 30%, 35% or even at least 40%. In some cases the, concentration may be as high as 50%

The process of the present invention may enable the polymer beads to be produced at a rate of at least 15 kg/hour, preferably at a rate of at least 20 kg/h. This may be as high as 1 or 2 tonnes/h, or even as high as 5 or 10 tonnes/h and for instance as high as 50 tonnes/h or more.

The monomers which can be used for making the polymers of the invention can be any of those conventionally used for the production of water soluble or superabsorbent polymer beads from ethylenically unsaturated material. The monomers are usually preferably ethylenically unsaturated monomers and frequently acrylic monomers or vinylformamide.

The ethylenically unsaturated monomers can be water-soluble or water-insoluble ethylenically unsaturated monomers. The ethylenically unsaturated monomers may be obtained by a chemically catalysed process, a biologically catalysed process or a biological process.

Suitably the monomer or monomer blend may be water-soluble or at least partially hydrophilic or amphiphilic. When the monomer, each monomer or blend of monomers are water-soluble preferably they have a solubility of at least 5 g in 100 mL of water at 25° C.

Water-soluble ethylenically unsaturated monomers can be carboxylic acids of formula (I)

or salts thereof, in which $R^1$, $R^2$ and $R^3$ are the same or different and are hydrogen, $C_{1-2}$-alkyl, carboxy or $C_{1-2}$-alkyl substituted with carboxy, (II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion, Amides of Formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation, vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium or alkali metal salts thereof. Examples of alkali metals are sodium and potassium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethylmethacrylate methyl chloride quaternary salt.

Examples of amides of formulae III, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methypropane sulfonic acid.

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble ethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble ethylenically unsaturated monomers are methyl acrylate, ethyl acrylate, butyl acrylate, 2-ethyl hexyl acrylate, stearyl acrylate, methyl methacrylate and stearyl methacrylate.

Preferably the ethylenically unsaturated monomers are water-soluble.

More preferred ethylenically unsaturated monomers are water-soluble and are selected from the group consisting of Carboxylic Acids of Formula or salts thereof, in which $R^1$, $R^2$ and $R^3$ are the same or different and are hydrogen or methyl, carboxy or methyl substituted with carboxy,

Esters of Formula wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion, Amides of Formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation.

Examples of $C_{2-3}$-alkylene are ethylene, trimethylene and propylene. Examples of $C_{1-3}$-alkyl are methyl, ethyl, propyl and isopropyl.

Even more preferred ethylenically unsaturated monomers are water-soluble and are selected from the group consisting of

Carboxylic Acids of Formula (I)

or salts thereof, in which $R^1$ is hydrogen or methyl and $R^2$ and $R^3$ are both hydrogen,
Esters of Formula (II)

wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkylsulfate,
Amides of Formulae (III)

(IV)

(V)

wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal.

Most preferred ethylenically unsaturated monomers are water-soluble and are selected from the group consisting of acrylic acid or salts thereof, esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate,

Acrylamide and Amides of Formula (V)

wherein $R^7$, $R^8$, $R^9$ have the meaning as indicated above, L is $C_{2-4}$-alkylene, $R^{10}$ is hydrogen, and M is hydrogen, ammonium or an alkali metal.

Examples of $C_{2-4}$-alkylene are ethylene, trimethylene, propylene, 2-methylpropylene, tetramethylene and ethylethylene.

Even most preferred the ethylenically unsaturated monomer is water-soluble and is either acrylamide or a mixture of acrylamide with water-soluble ethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, is at least 30% by weight based on the weight of the monomer mixture.

When the monomer or mixture of monomers comprises acrylamide, the acrylamide may have been produced by a suitable process, for instance by hydrolysis of acrylonitrile. Typically this may be one of the known chemically catalysed processes using inorganic catalysts such as Raney copper. Preferably however, the acrylamide would have been prepared using a biological or biologically catalysed process. Suitably this may be achieved by contacting acrylonitrile with a nitrile hydratase enzyme, for example as documented in the patents and literature. Superior polyacrylamide products may be obtained by employing the process of the present invention to polymerise acrylamide, optionally in combination with other ethylenically unsaturated monomers, wherein acrylamide has been obtained by a biological process. Such polyacrylamides would exhibit superior properties as flocculants for instance for water treatment (including sewage sludge treatment), mining applications and as retention/drainage aids in the paper industry.

Where the monomer, each monomer or monomer blend contains at least one of amphiphilic monomers and/or partially hydrophilic monomers desirably they may be any such monomers which are known in the literature.

Amphiphilic monomers or partially hydrophilic monomers are defined as monoethylenic unsaturated based monomers which have at least one hydrophilic group and at least one hydrophobic group in its structure. The partial solubility in water can be based on the presence of anion and/or cation and/or other neutral hydrophilic moieties.

They include, for instance, acrylamide-derived cationic monomer (Formula I) or acrylate-derived cationic monomer (Formula II) containing a hydrophobic chain and with the general formula:

Where:
R1, R2, R3, R4, R5, R6, independently, can be a hydrogen or an alkyl chain containing 1 to 4 carbons
Q: an alkyl chain containing 1 to 8 carbons
R7: an alkyl or alkenyl or arylalkyl chain containing 6 to 30 carbons
X: a halide selected from the group including chloride, bromide, iodide, floride or a counterion with a negative charge A preferred structure for formula (I) is when R1=R2=R3=R4=H, which generates an acrylamide moiety. Another preferred structure is obtained when R1=R2=R4 and R3=CH3. Then a methacrylamide derivative is generated.

Similar to formula (I), a preferred structure for formula (II) is when R1=R2=R3=H, which generates an acrylate moiety. Another preferred structure is obtained when R1=R2=H and R3=CH3. Then a methacrylate derivative is generated.

Among all alkyl possibilities for Q, preferably Q is either an ethyl or a propyl group Preferably, R5=R6 and are either methyl or ethyl moieties For the substitute R7, preferred structures are hexyl, octyl, decyl, dodecyl, hexadecyl, octadecyl or benzyl Examples of preferred structures for the invention having the formula (I) are N-acrylamidopropyl-N,N,dimethyl-N-dodecyl ammonium chloride, N-methacrylamidopropyl-N,N,dimethyl-N-dodecyl ammonium chloride, N-acrylamidopropyl-N,N,dimethyl-N-dodecyl ammonium bromide, N-methacrylamidopropyl-N,N,dimethyl-N-dodecyl ammonium bromide, N-acrylamidopropyl-N,N,dimethyl-N-octadecyl ammonium chloride, N-methacrylamidopropyl-N,N,dimethyl-N-octadecyl ammonium chloride, N-acrylamidopropyl-N,N,dimethyl-N-octadecyl ammonium bromide, N-methacrylamidopropyl-N,N,dimethyl-N-octadecyl ammonium bromide, N-acrylamidopropyl-N,N,dimethyl-N-benzyl ammonium chloride, N-methacrylamidopropyl-N,N,dimethyl-N-benzyl ammonium chloride, N-acrylamidopropyl-N,N,dimethyl-N-benzyl ammonium bromide, N-methacrylamidopropyl-N,N,dimethyl-N-benzyl ammonium bromide. Examples of preferred structures for the invention having the formula (II) are N,N-dimethylaminoethyl acrylate-N-dodecyl chloride, N,N-dimethylaminoethyl methacrylate-N-dodecyl chloride, N,N-dimethylaminoethyl acrylate-N-dodecyl bromide, N,N-dimethylaminoethyl methacrylate-N-dodecyl bromide, N,N-dimethylaminoethyl acrylate-N-octadecyl chloride, N,N-dimethylaminoethyl methacrylate-N-octadecyl chloride, N,N-dimethylaminoethyl acrylate-N-octadecyl bromide, N,N-dimethylaminoethyl methacrylate-N-octadecyl bromide, N,N-dimethylaminoethyl acrylate-N-benzyl chloride, N,N-dimethylaminoethyl methacrylate-N-benzyl chloride, N,N-dimethylaminoethyl acrylate-N-benzyl bromide, N,N-dimethylaminoethyl methacrylate-N-benzyl bromide Other amphiphilic monomer structures can be based on neutral hydrophilic groups. Their formula among other can be based on acrylate-derivative (Formula III) or allyl-derivative (Formula IV). In this case, the solubility is water is enhanced by the presence of ethylene oxide groups present.

Where:
k and l, are independently two positive real numbers included in the range from 0 to 100, with k+l>3
R1 can be a hydrogen or an alkyl chain containing 1 to 4 carbons
R2 can be an alkyl, alkenyl or arylalkyl chain containing from 1 to 30 carbons
Q can be O or NR4 where R4 is selected from H, alkyl, cycloalkyl, heterocycloalkyl, aryl or hetaryl
R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of preferred R2 groups for the formula (II) and (III) are methyl, ethyl, butyl, pentyl, hexyl, dodecyl, hexadecyl, octadecyl or benzyl Examples of R3 groups for the formula (II) and (III) are hydrogen, methyl, ethyl, hexyl, decyl, dodecyl, hexadecyl, octadecyl, benzyl or tristyrylphenyl One preferred substructures family derived for the formula (III) is accessible when the value of l in (III) is equal to zero. Then, a new the amphiphilic monomer based on neutral hydrophilic group can be defined by the Formula (V)

(V)

Where:

k is a positive real numbers included in the range from 0 to 100

R1 can be a hydrogen or an alkyl chain containing 1 to 4 carbons

R2 can be an alkyl, alkenyl or arylalkyl chain containing from 1 to 30 carbons

Q can be O or NR4 where R4 can be a hydrogen or an alkyl group containing 1 to 4 carbons R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of R3 groups for the formula (V) are hydrogen, methyl, ethyl, hexyl, decyl, dodecyl, hexadecyl, octadecyl, benzyl or tristyrylphenyl Formula (V) include, among other, commercial products like for example Visiomer® C18 PEG 1105 MA W, Plex® 6877-0 or Lutencryl® 250 which are trade names for a methacrylate derivative based on C16C18 fatty alcohol ethoxylated. Sipomer® BEM is another example of commercial product which fulfils the formula (V). It is a methacrylate derivative based on behenyl alcohol ethoxylated. Another preferred example is Sipomer® SEM which is a polyoxyethylene methacrylate ω-tristyrylphenyl monomer.

Other amphiphilic monomer structures based on neutral hydrophilic groups can be described by the formula (V)

(VI)

Where:

k and l and m, are independently three positive real numbers included in the range 0 to 100, with k+l+m>3

R1 can be a hydrogen or an alkyl chain containing 1 to 4 carbons

R2 can be either —($C_nH_{2n}$)— or —O—($C_nH_{2n}$)— or —C(O)—O—$C_nH_{2n}$)— or —C(O)—NR$_7$—$C_nH_{2n}$)— with R7 which can be a hydrogen or an alkyl containing 1 to 4 carbons. In all four different structures of R2, n is a whole number from 1 to 6

R3, R4, R5 are independently either H or an alkyl group containing 1 to 30 carbons or an arylalkyl group containing 6 to 30 carbons. Moreover, to be amphiphilic monomers, molecules based on the formula (VI) need to have at least one of the moieties R3, R4 or R5 equivalent to H. In this case, [CH2-CH($R_i$)—O]$_x$ is a poly(ethylenoxide) group which is the neutral hydrophilic group of the structure R6 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Examples of preferred R3, R4 or R5 groups for the formula (VI) are hydrogen, methyl, ethyl, butyl, pentyl, hexyl, dodecyl, hexadecyl, octadecyl or benzyl Examples of R6 groups for the formula (VI) are hydrogen, methyl, ethyl, hexyl, decyl, dodecyl, hexadecyl, octadecyl, benzyl or tristyrylphenyl Depending on the ethylenically unsaturated monomer or monomer mixture used, the polymers produced by the process of the present invention can be anionic, cationic or non-ionic.

When the beads are to be superabsorbent, the monomers are usually anionic (for instance acrylic acid or salt such as sodium acrylate) or a blend thereof with acrylamide.

When the polymer is to be water soluble, it may be nonionic (for instance polyacrylamide homopolymer) or anionic or cationic and is often formed from a blend of acrylamide or other water soluble non-ionic monomer with ionic monomer. Desirably water-soluble polymers may have a solubility in water of at least 5 g per 100 mL of water at 25° C.

Water soluble bead polymers are typically used as viscosifiers, coagulants or flocculants, including retention aids for paper making. They can be anionic, cationic or non-ionic.

Typically they have intrinsic viscosity (IV), of at least 4 dl/g although lower IV beads (e.g., IV 1-4 dl/g) of cationic polymers such as poly diallyl dimethyl ammonium chloride (poly DADMAC) can also be made by this process and used as coagulants. The IV will usually always be above about 0.5 dl/g since lower molecular weight polymers tend to be difficult to put into satisfactory dry bead form.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers is measured using a Number 1 suspended level viscometer at 25° C. in 1M buffered salt solution. Intrinsic viscosity values stated are determined according to this method unless otherwise stated.

The weight average molecular weight of the polymer beads should generally be at least 1 million g/mol, for instance at least 2 million g/mol and often at least 3 million g/mol, preferably at least 5 million g/mol. In some cases the weight average molecular weight may be at least 7 million g/mol and sometimes at least 10 million g/mol. The weight average molecular weight may be as high as 18 or 20 million, for instance as high as 25 million g/mol or even as high as 30 million g/mol or higher. The weight average molecular weight can be determined by static light scattering, small angle neutron scattering, x-ray scattering or sedimentation velocity.

Gel permeation chromatography beads may be formed of acrylamide or blends of acrylamide with other monomers and sufficient polyethylenic cross linker to restrict their swelling in water to 0.2 to 2 times their weight, e.g., 15 to 30%.

The distribution of sizes of polymer beads can, in the invention, be controlled primarily by the distribution of sizes of the extrusion orifices and the extrusion conditions. If (as is usual) all the orifices have substantially the same size then it is possible in the invention to obtain beads which are substantially all of the same size. Accordingly the invention is useful both where a narrow size range is desirable (e.g., as flocculant or viscosifier) and where it is essential for optimum performance (e.g., in a slow release composition).

According to a second aspect of the invention we provide novel beads of water soluble or water swellable polymeric material. These beads are obtainable by the process of the invention or employing the apparatus of the invention.

In addition the water-soluble or water swellable polymer beads obtainable by the process or apparatus according to the present invention can be manufactured in large amounts, for instance held in a container containing at least 500 kg of said polymer beads or even up to 1 tonne or more. Suitably the container may be a single storage hopper, a single container used for transportation of the product. Especially desirably the container may be a holding vessel which contains a plurality of single containers, for instance a transportation vehicle, a boat or a ship.

Desirably the process or apparatus of the present invention enable water soluble or water swellable polymer beads to be produced which may have very low levels of residual unreacted monomer, for instance acrylamide. Frequently the amount of residual unreacted monomer, for instance acrylamide, may be less than 500 ppm, preferably less than 200 ppm. The amount of residual unreacted monomer, for instance acrylamide, may be as low as 1 ppm or as low as 5 ppm or 10 ppm.

Suitably the polymer beads are of water soluble polymeric material.

In another aspect of the invention the beads contain an active ingredient distributed substantially uniformly through the polymeric material, which is often a cross linked material.

In some cases it may be desirable to grind the so formed the polymer beads to produce a polymer powder. Grinding equipment which is suitable for grinding polymers into a powder is well known to those skilled in the art. Thus the process according to the present invention may be further modified such that the so formed polymer beads are ground to form a powder.

Suitable apparatus for carried out the invention is illustrated diagrammatically in the accompanying drawings.

Figure 1:
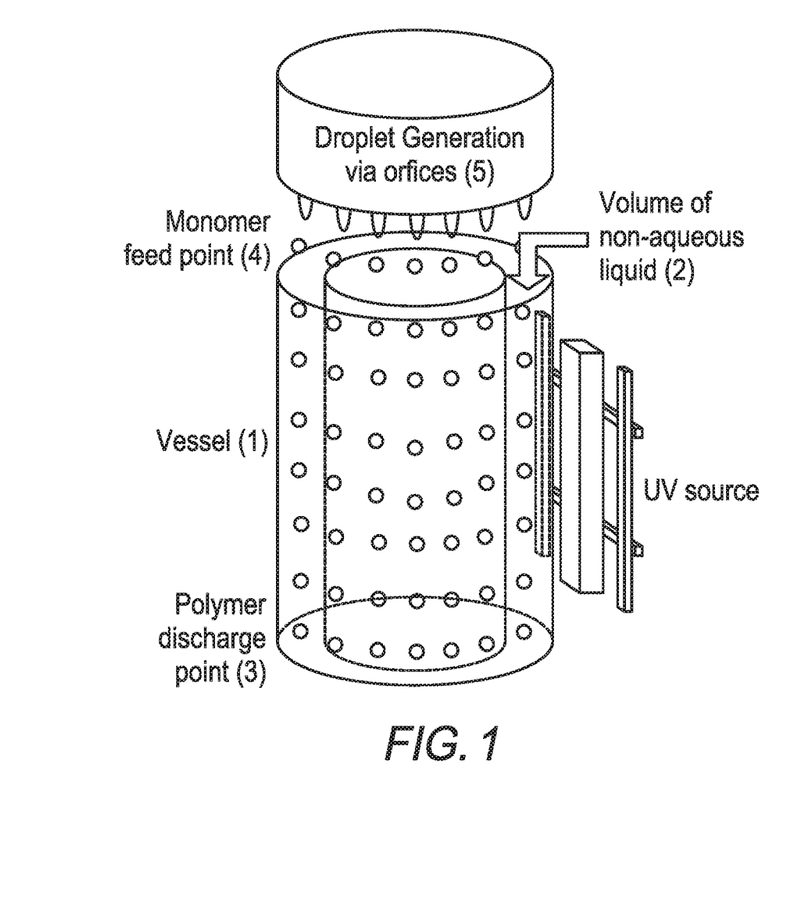
FIG. 1 shows an apparatus having a cylindrical vessel containing two concentric walls.

FIG. 1 shows one type of apparatus, consisting of a cylindrical vessel (1) containing two concentric walls. Monomer beads are formed by extrusion of aqueous monomer employing orifices (5) for feeding or extruding monomer. The monomer beads enter the volume of non-aqueous liquid (2) at the monomer feed point (4) and are initiated and irradiated using the LED UV source and descend as polymerising beads through a volume of non-aqueous liquid between the concentric walls of the vessel. The suspension of polymer beads is removed through the polymer discharge point (3) situated at the base of the vessel.

Figure 2:
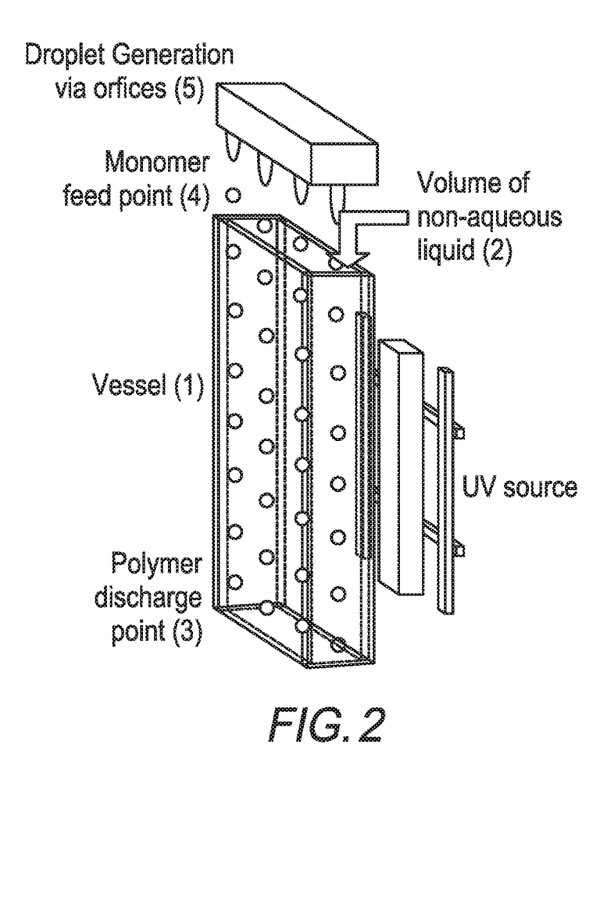
FIG. 2 shows an apparatus having a vessel with a rectangular horizontal cross section.

FIG. 2 shows another type of apparatus and differs from the apparatus of FIG. 1 in that the vessel (1) has a rectangular horizontal cross-section.

EXAMPLE

The preparation of aqueous monomer beads is carried out in a 4 L vessel. The aqueous monomer phase is dispersed in Exxsol D40 oil. Total filling level is 60-70% of the 4 L vessel. The amount of dispersed aqueous monomer phase is 30-40 wt % with respect to total amount of dispersion. Aqueous monomer phase comprises of two monomers out of which 70-80 wt % (calculated with respect to total amount of monomer solids) is acrylamide, and the rest is dimethylaminoethylacrylate methyl chloride quaternary salt.

A stabilizer (0.5 wt-% with respect to dispersed phase; e.g. a copolymer from methyl methacrylate, stearyl methacrylate, acrylic acid and methacrylic acid) is added to the continuous phase and into the dispersed monomer solution an initiator-2,2'-Azobis(2methylpropionamidine)dihydrochloride—is mixed in.

Polymerizations are initiated by UV irradiation. Different UV sources have been tested as shown in Table 1. Efficiency of UV irradiation is estimated by the time required for suspension to reach maximum temperature, $T_{max}$, as a consequence of the adiabatic temperature increase due to polymerization heat.

TABLE 1

| UV source | Relevant intensity (320-400 nm), mW/cm$^2$ | Significant radiants outside of 320-400 nm range | time to $T_{max}$, min |
| --- | --- | --- | --- |
| 400 W Hoenle Middle pressure lamp (Fe doped Hg lamp) | 100 | yes | 0.8-2 |
| Philips actinic bl tl -K 40 W low pressure lamp - 4 lamps in parallel | 25 | no | 2.5-4 |
| Nichia NCSU033B LED | 100 | no | 0.8-2 |

Both middle pressure and LED UV lamps provide relevant intensity (UV intensity in the range 320-400 nm) of around 100 mW/cm$^2$ allowing for efficient polymerizations under 2 min time. However, middle pressure lamps radiates significant energy outside of the relevant range (320 nm to 400 nm). The LED irradiation is focused to the range of approximately 365 nm+/−10 nm. LEDs are advantageous in terms of equipment size as well. LEDs are at least 4 times more compact than other used UV sources.

The invention claimed is:

1. A reverse-phase suspension polymerisation process for the manufacture of polymer beads comprising forming aqueous monomer beads comprising an aqueous solution of water-soluble ethylenically unsaturated monomer or monomer blend and polymerising the monomer or monomer blend to form polymer beads while suspended in a non-aqueous liquid, and recovering polymer beads, in which the process comprises:

providing in a vessel a volume of non-aqueous liquid wherein the volume of non-aqueous liquid extends between at least one polymer bead discharge point and at least one monomer feed point, feeding the aqueous monomer or monomer blend through orifices into, or onto, the non-aqueous liquid to form aqueous monomer beads, allowing the aqueous monomer beads to flow towards the polymer bead discharge point, subjecting the aqueous monomer beads to actinic radiation from at least one actinic radiation source to initiate polymerisation to form polymerising beads, wherein the polymerising beads have formed polymer beads when they reach the polymer bead discharge point, wherein an intensity of the actinic radiation is in the range of 30 to 1,000 mW/cm$^2$, wherein the nonaqueous liquid and the monomer beads are at a temperature of below 30° C. when polymerization is initiated, removing a suspension of the polymer beads in non-aqueous liquid from the vessel at the polymer bead discharge point and recovering water soluble or water-swellable polymer beads from the suspension.

2. The process according to claim 1 in which the polymerisation conditions comprises subjecting the aqueous monomer beads to ultraviolet light from at least one ultraviolet light source or to at least one light source that comprises at least one light emitting diode (LED).

3. The process according to claim 1, further comprising subjecting the polymer beads removed from the vessel at the polymer bead discharge point to a post polymerisation stage.

4. The process according to claim 1 in which the aqueous monomer or monomer blend is fed into the non-aqueous liquid.

5. The process according to claim 1 in which the vessel comprises a wall or walls which comprise at least one ultraviolet light translucent section or ultraviolet light transparent section.

6. The process according to claim 5 in which the transparent section comprises borosilicate glass or quartz glass.

7. The process according to claim 5 in which at least one light source is mounted externally to the vessel such that the ultraviolet light enters the vessel through the transparent section of the vessel.

8. The process according to claim 1 in which at least one light source is mounted inside the vessel.

9. The process according to claim 8 in which at least one light source is submerged within the non-aqueous liquid.

10. The process according to claim 1 in which the aqueous monomer or monomer blend comprises a photoinitiator selected from the group consisting of 2,2'-Azobis (N,N'-dimethyleneisobutyramidine) dihydrochloride, 2,2'-Azobis (2-amidinopropane) Dihydrochloride, 2,2'-Azobis{2-[1-(2-hydroxyethyl)-2-imidazolin-2-yl]propane}dihydrochloride, 2,2'-Azobis(1-imino-1-pyrrolidino-2-ethylpropane)dihydrochloride, 2,2'-Azobis[2-methyl-N-(2-hydroxyethyl)-propionamide], 4,4'-Azobis(4-cyanovaleric acid) and 2,2'-Azobis (2-methylpropionitrile).

11. The process according to claim 1, in which an amphipathic polymeric stabiliser is included in the non-aqueous liquid.

12. The process according to claim 1, wherein the water-soluble ethylenically unsaturated monomer or monomer blend comprises at least one monomer selected from the group consisting of acrylamide, methacrylamide, N-vinyl pyrrolidone, 2-hydroxy ethyl acrylate, acrylic acid (or salts thereof), methacrylic acid (or salts thereof), itaconic acid (or salts thereof), maleic acid (or salts thereof), 2-acrylamido-2-propane sulphonic acid (or salts thereof), vinyl sulphonic acid (or salts thereof), allyl sulphonic acid (or salts thereof), dimethyl amino ethyl acrylate (or acid salts or quaternary ammonium salts thereof), dimethyl amino ethyl methacrylate (or acid salts or quaternary ammonium salts thereof), dimethyl amino propyl acrylamide (or acid salts or quaternary ammonium salts thereof), dimethyl amino propyl methacrylamide (or acid salts or quaternary ammonium salts thereof) and combinations of any of the above.

13. The process according to claim 12 in which at least one monomer has been prepared by a chemically catalysed process, a biologically catalysed process, or a biological process.

14. The process according to claim 12 in which the acrylamide has been prepared by a biological catalysed process or a biological process.

15. The process according to claim 1 in which the so formed polymer beads are ground to produce a polymer powder.

16. The process according to claim 1 in which the process is performed in a continuous mode.

17. The process according to claim 1, wherein the aqueous monomer or monomer blend is fed into, or onto, the non-aqueous liquid through a grid of regularly spaced orifices.

18. The process according to claim 1, wherein the aqueous monomer or monomer blend is extruded as droplets through a grid of regularly spaced orifices into, or onto, the non-aqueous liquid.

19. The process according to claim 1, wherein the outer cylinder has a cross-sectional diameter which is at least 0.05 m greater than that of the inner cylinder.

20. The process according to claim 1, wherein the outer cylinder has a cross-sectional diameter which is at least 0.1 m greater than that of the inner cylinder.

21. The process according to claim 1, wherein the vessel is an annular gap between concentric inner and outer cylinders or a rectangular space.

22. The process according to claim 1, wherein the vessel is an annular gap between concentric inner and outer cylinders.

23. The process according to claim 1, wherein the vessel is an annular gap between concentric inner and outer cylinders or a rectangular space.

* * * * *